United States Patent [19]
Brunson et al.

[11] 4,297,581
[45] Oct. 27, 1981

[54] METHOD FOR THE FAST AND ACCURATE IDENTIFICATION OF CORE POWER IN NUCLEAR REACTORS

[75] Inventors: William T. Brunson; Anthony F. Lexa, both of Lynchburg, Va.

[73] Assignee: The Babcock & Wilcox Company, New Orleans, La.

[21] Appl. No.: 3,444

[22] Filed: Jan. 15, 1979

[51] Int. Cl.$^3$ .............................................. G01T 3/00
[52] U.S. Cl. .................................... 250/391; 250/392
[58] Field of Search .................. 176/19 R, 19 J, 20 R, 176/24; 250/390, 391, 392

[56] References Cited

U.S. PATENT DOCUMENTS 3,356,577  12/1967  Fishman .............................. 176/24
3,752,735   8/1973  Musick et al. ...................... 176/20 R
4,103,161   7/1978  Thomasson ......................... 250/392

Primary Examiner—Alfred E. Smith
Assistant Examiner—Carolyn E. Fields
Attorney, Agent, or Firm—Robert J. Edwards; Robert H. Kelly

[57] ABSTRACT

A method is disclosed for rapidly and accurately generating an output signal corresponding to the power of a nuclear reactor core. The method comprises generating out of core neutron flux signals at different time intervals and utilizing predetermined relationships therebetween to adjust a more accurate thermal power signal which has a slow response to transient power conditions.

4 Claims, 2 Drawing Figures

METHOD FOR THE FAST AND ACCURATE IDENTIFICATION OF CORE POWER IN NUCLEAR REACTORS

TECHNICAL FIELD

The invention relates to a method of rapid and accurate reactor-power determination in nuclear reactors by the use of time-delayed and prompt measured values.

BACKGROUND ART

Rapid and accurate determination of the reactor power is of great importance for the control, limiting and safety systems in nuclear reactors, particularly those in utilized electric power production plants.

The use of core-external (excore) neutron detectors for determination of the reactor power in nuclear reactors is known. These measure the neutron flux outside of the reactor core, for example, from below source level when the reactor is shutdown to over 125% of full power, and may provide signals to the operators, the reactor protection system, and the reactor controls. Typical system excore neutron detectors are located in the vertical walls immediate outside the reactor vessel but inside the primary shielding. A normal signal span from source power to overpower trip is approximately ten decades (a range of $10^{10}$) and thirteen decades (a range of $10^{13}$) of neutron flux information to include margins at both ends of the operating scale to allow for variations in source strength. These neutron-flux measurement signals are nearly prompt (instantaneous) but in large reactor cores are not always proportional to the reactor power output, particularly with load transients. Moreover, the measured signals of core-external neutron detectors must be calibrated either manually for the reactor powers determined from the reactor heat balance calculated by the plant computer or automatically for the reactor powers determined from the warm-up range of the coolant in the reactor core.

In pressurized water reactors, the nuclear reactor is cooled by water as a primary coolant under considerable pressure so that the average enthalpy of the water leaving the reactor is less than the enthalpy at saturation temperature. The high pressure primary coolant is conducted to steam generators and steam is produced on a low pressure or secondary side from feedwater which enters the steam generators. A heat balance may be performed on either the primary or secondary side.

The automatic calibration of the neutron-flux measurement signal with the aid of the reactor power determined from the warm-up range of the coolant in the primary loop normally has been effected by means of a closed-loop control system. The drawback of this is that with fast power changes calibration cannot follow the reactor power quickly enough. This in turn means that with fast load changes the automatic calibration system must be disabled as it might result in nonconservative power values.

While determination of the reactor power from a heat balance on the primary or secondary side is considerably more accurate, for physical reasons, than its determination from core-external instrumentation, this thermal power measurement system is relatively slow, compared to the prompt indication of core-external neutron detectors, and the signal output thereof, under transient conditions, lags mainly because of the transit time of the coolant between the temperature measuring points at the inlet to and outlet from the core.

Varying approaches, differing from that of the invention described hereafter, have been suggested in the background art to exploit the advantages while avoiding the limitations of power measurements dependent on neutron flux and thermal parameters. U.S. Pat. No. 3,752,735, for example, teaches using the difference between a neutron flux power signal and a thermal power signal (a signal based on coolant thermal parameters) to adjust neutron flux power signals. U.S. Pat. No. 3,356,577 discloses a similar technique.

SUMMARY OF THE INVENTION

In accordance with the methods of the invention, a signal is generated by means of the time-delayed but more accurate measured values from a heat balance. The thermal power signal is adjusted to rapidly and accurately generate an output signal corresponding to the power of the nuclear reactor core by varying the thermal power signal in proportion with a predetermined relationship of out of core neutron flux detectors. This thermal power signal is modified in one embodiment by differences in the prompt but less accurate measured values of core-external neutron detectors, rapidly and with minimum loss of accuracy, to produce an output signal which is usable with fast transient events. In alternative embodiment, an adjusted thermal power signal is formed as a function of the product of the thermal power signal and the quotient of the core external neutron flux detectors at different times.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described preferred embodiments of the invention.

DESCRIPTION OF THE PREFERRED EMBODIMENTS

Figure 1:
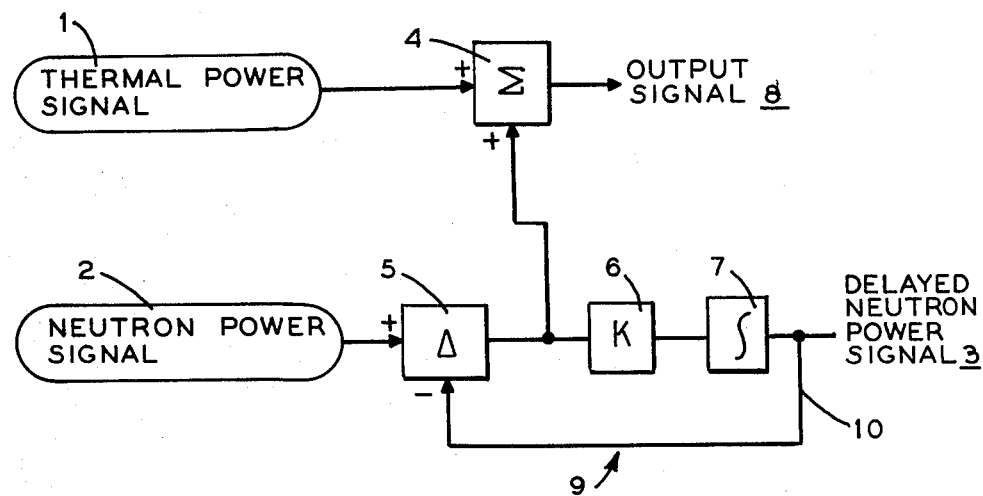
FIG. 1 is a schematic logic diagram of a system embodying the principles of a preferred embodiment of the invention.

In accordance with the preferred embodiments of the invention, the thermal reactor output is determined from the time-delayed measured values of a heat balance on the primary or secondary side, and that the change in the measured value of the prompt-indicating core-external neutron detectors occurring during the time delay is impressed as a prompt component on the value of the thermal reactor output determined from the heat balance.

This arrangement results in a prompt and accurate signal which is usable for reactor control, power limitation or reactor safety, respectively, and which is reliably applicable to fast transient events.

The measured values are preferably determined by digital or analog means or both.

The time-delayed measured value may, moreover, be formed from the coolant enthalpy difference or from the coolant warm-up range.

In accordance with a preferred variant of the method, the prompt component is formed as the difference in the core-external neutron-detector indications between a first point in time and a subsequent time. For this case, a reactor power output signal is formed as the sum of the thermal reactor output (at the first point in time) and the prompt component.

In an alternative embodiment, the prompt component may be formed as the quotient of the core-external neutron-detector indication at the first point in time and at the subsequent time. Here, the reactor power output signal is formed as the product of the thermal reactor output and the prompt component.

The method in accordance with the invention and its principle of operation will now be explained with reference to a practical application.

The reactor thermal power signal is formed from a thermal balance on the primary coolant side of the reactor coolant system, for example. Determination of this value takes relatively long compared to determination of the nearly prompt measured value of the core-external neutron detectors. The difference in time is a few seconds and is designated $t_o$. The change in the measured value of the prompt-indicating core-external neutron detectors occurring during this time delay is impressed on the measured value of the primary coolant warm-up range as prompt component. This prompt component is formed in two ways: First, equating to the difference in the core-external neutron-detector indication between the time t and the time $t-t_o$; Second, by equating it to the quotient of the core-external neutron-detector indication at the time t and the time $t-t_o$.

In the first case, a reactor thermal power out signal is determined as a function of the sum of the thermal power signal and the prompt component.

In the second case, a reactor thermal power signal is formed as a function of the product of the thermal power signal and the prompt component.

The first case is better suited to an analog system while the second case lends itself better to a digital system (due to the required multiplication functions), because of the higher accuracy requirements.

The value of the reactor power Q so determined is suitable for use also with fast transient events in reactor control, in the power-limiting system and in the reactor safety system.

FIG. 1 schematically illustrates the logic of a system embodying the principles of the invention. Typically, a thermal power signal 1 may be derived from the enthalpy difference of the primary coolant entering and leaving the reactor core or that of the secondary coolant entering and leaving the steam generator. The enthalpy values are determined by measuring process parameters attained through instrumentations, and calculating enthalpy as is well known in the art. A neutron flux signal 2 is concurrently generated by neutron power signal sensors, typically out of core flux detectors. As described hereafter, neutron power signals serve to modify the thermal power signal. This is accomplished by means of a feedback loop, generally indicated at 9, wherein a delayed power or flux signal 3 is fed back through a line 10 to a difference unit 5 to generate a normalizing signal in proportion to the difference between the neutron flux signal 2 and the delayed flux signal 3. The normalizing signal is combined with the thermal power signal 1 in a summing unit 4 to obtain a value equal to the instantaneous core power then being perceived by thermal sensors (but not immediately available due to the time lag of the thermal response). Under steady state conditions, no adjustment is made to the thermal power signal 1 since there would be no change in the values of the neutron flux signals and the normalization signal would, accordingly, be zero. Within the exemplary feedback loop 9 of FIG. 1, the normalization signal is adjusted by a gain adjustment unit 6 which adjusts the integration rate of an integrating unit 7 by a time factor "K" so that the delayed neutron power signal 3 has the same time response as the thermal power signal. The integrating unit 7, also receiving the normalization signal from the difference unit 5, generates the delayed neutron power signal 3, which inputs to the difference unit, adjusted to the time of the thermal signal which is to be normalized by the output of the difference unit.

Figure 2:
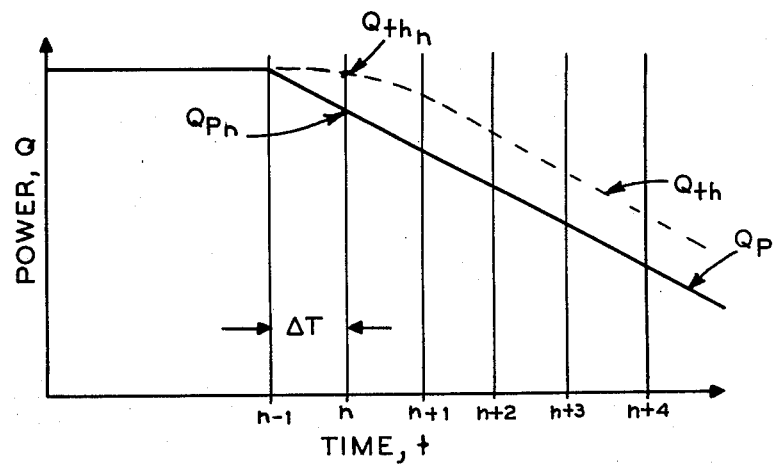
FIG. 2 is an illustration graphically displaying a thermal power signal and neutron power signal as a function of time.

FIG. 2 graphically depicts an illustrative thermal power signal (Qth) derived from an enthalpy difference and a corresponding neutron power signal (Qp) from out of core neutron detectors as a function of time. At a given time (t=n), the thermal power perceived by the thermal sensors can be adjusted by digital means such that a system output signal is defined by the relation:

$$(\text{Output Signal})_n = Q_{th_n} \frac{(Qp_n)}{(Qp_{n-1})}$$

The time differential between measurement ($\Delta T$) must be selected so as to be approximately equal to the time constant of the Qth response. Hence, the thermal power signal at time n ($Qth_n$) is adjusted by the ratio of the out of core neutron power signal at time n ($Qp_n$) to the out of core neutron power at time $n-1$ ($Qp_{n-1}$).

Thus, the invention comprehands a method of taking the slow, more accurate thermal power signal, which is accurate under steady state conditions but has a slow response to transient conditions, and combining it with differences between nearly prompt neutron flux signals, which are prompt responding but have steady state errors, in a novel manner to quickly and accurately identify the core power of a nuclear reactor.

We claim:

1. A method for accurately and rapidly generating an output signal corresponding to the power of a nuclear reactor having a reactor core and a heat receiving fluid passing through said core in heat transfer relationship therewith which comprises: generating a first neutron flux signal corresponding to reactor power at a first point in time; generating a second neutron flux signal corresponding to reactor power at a subsequent point in time; generating a thermal power signal, at the subsequent point in time, derived from a thermal differential of the fluid cooling the reactor; generating an output signal, at the subsequent point in time, by varying the thermal power signal in proportion with a predetermined relationship of the first and second neutron flux signals.

2. The method of claim 1 wherein the output signal is generated in proportion to the sum of the thermal power signal and the difference between the first and second neutron flux signals.

3. The method of claim 1 wherein the output signal is generated in proportion to the product of the thermal power signal and a quotient of the first and second neutron flux signals.

4. The method of claim 3 wherein the first neutron flux signal is the division of the quotient of the neutron flux signals.

* * * * *

UNITED STATES PATENT AND TRADEMARK OFFICE
CERTIFICATE OF CORRECTION

PATENT NO. : 4,297,581

DATED : Oct. 27, 1981

INVENTOR(S) : William T. Brunson et al.

It is certified that error appears in the above—identified patent and that said Letters Patent is hereby corrected as shown below:

ABSTRACT between line 4, before "out" insert -- an --.

Column 4, line 34, "comprehands" should read -- comprehends --

Column 4, line 66, "division" should read -- divisor --.

Signed and Sealed this

Second Day of March 1982

[SEAL]

Attest:

GERALD J. MOSSINGHOFF

Attesting Officer     Commissioner of Patents and Trademarks